March 18, 1941. C. W. SIMONDS 2,234,985
RETURN GATE FOR POULTRY
Filed March 17, 1939

Inventor
C. W. Simonds
By Lester L. Sargent
Attorney

Patented Mar. 18, 1941

2,234,985

UNITED STATES PATENT OFFICE 2,234,985

RETURN GATE FOR POULTRY

Clark W. Simonds, Red Creek, N. Y.

Application March 17, 1939, Serial No. 262,515

1 Claim. (Cl. 43—65)

The object of my invention is to provide a novel return gate for poultry which will provide an easy means for a fowl to return to its proper enclosure without letting other poultry out at the same time. It is also an object of my invention to provide a device which is relatively inexpensive, easily installed and independent of the conventional gate. I attain these and other objects of my invention by the device illustrated in the accompanying drawing, of which—

Like characters of references indicate like parts in each of the several views.

Figure 3:
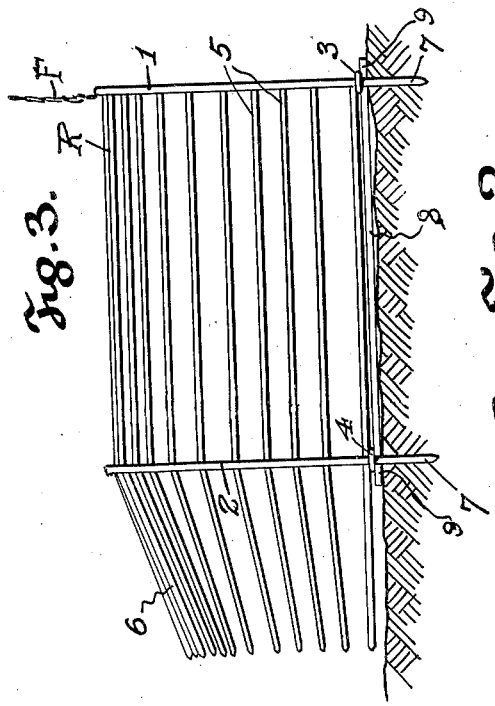
Fig. 3 is a side elevation of same.
Figure 2:
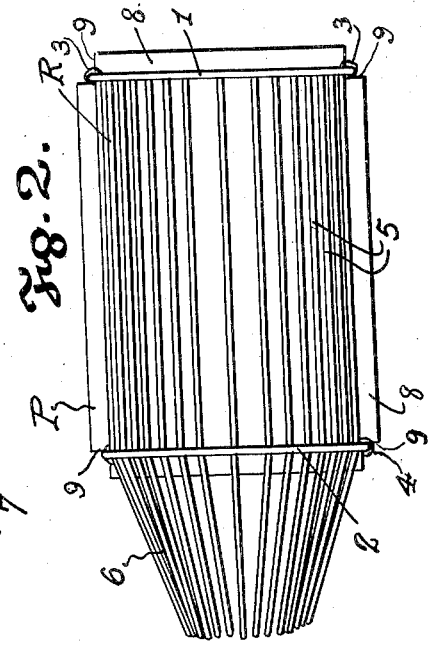
Fig. 2 is a top plan view of the invention.
Figure 4:
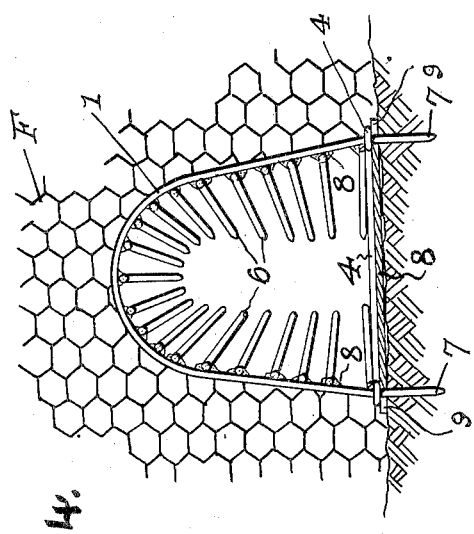
Fig. 4 is a front plan view of the invention.

Referring to the drawing, I provide an arcuate wire support 1 at the entrance of the gate, pointed ends 7 which project into the ground, a similar arcuate wire support, 2 spaced from support 1, a horizontal bar 3 bracing member 1, a similar cross bar 4 bracing member 2; and closely spaced longitudinal wires 5 affixed to members 1 and 2 and terminating in inwardly converging portions or extensions 6 of the wires, as shown in Figs. 2, 3 and 4. Members 6 being free at their outer ends and resilient they are easily expansible to permit the body of a fowl to push or pass through the opening but after it has passed, the resiliency of the wires causes them to return to the position shown in Fig. 4 and prevents the passage of a fowl through the return gate in the opposite direction from which it entered.

I also provide a platform or floor 8, the use of which is dependent upon the condition of the ground where the return gate is installed. If the ground is soft or muddy, the floor or platform 8 will be needed. If the ground is firm, this element of the invention may be dispensed with. The floor or platform 8 is provided with cut out corner portions 9 for the legs 7 of the arcuate wire supports 1 and 2 as shown in Figs. 2 and 3.

Figure 1:
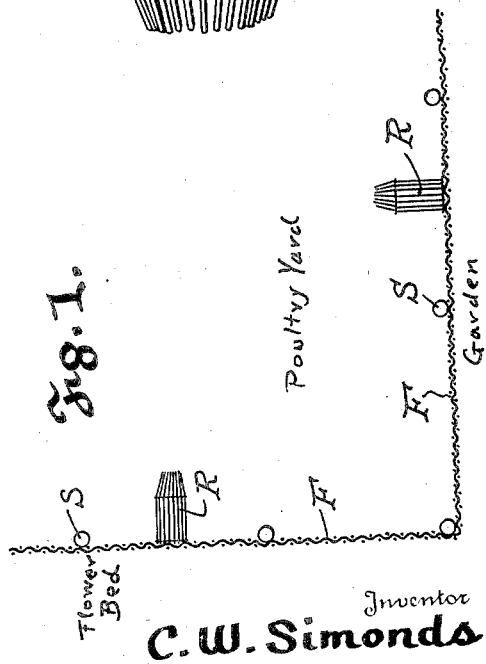
Figure 1 is a top plan view of a portion of a poultry yarn or enclosure showing a corner of the fence and the disposition of the return gates.

Referring to Fig. 1, there is illustrated a portion of a poultry yard enclosed by a wire fence F supported by the posts or stakes S and provided with my return gates R, the front supports 1 of which are preferably aligned approximately with the wire fence F at an opening therein as shown in Figs. 1 and 4 of the drawing.

It will be observed that the supports 1 and 2 are of suitable size to permit of the easy entrance of a particular size of fowl for which the gate is designed and that the converging ends are flexible and permit poultry to easily pass through same, expanding as the fowl passes but close enough together to prevent escape of the fowl from the poultry yard.

Poultrymen usually have their fowls yarded, or fenced off by themselves. Quite frequently, a fowl will fly over the fence or crawl through some unforeseen hole. Soon it wants to get back but will not fly back unless compelled to do so. Everyone who has kept poultry knows how exasperating it is to try to get these escaped fowls back into their proper quarters. This return gate allows the fowl to get back at once and yet does not let the others out. In other words, the fowl can go but one way and that is back to the side from whence it came. Suitable sizes of return gates are provided for baby chicks. There should be a larger size for pullets and bantams; the next larger size for Leghorns and those of similar size; the next larger size for Reds, Rocks, etc. and lastly, the largest size for Brahmas, Cochins and turkeys.

It will be observed that the extensions or legs 7 of the supporting frames 1 and 2 project into the ground to anchor the gate to the ground at the point desired.

The floor board or platform 8 may be of either metal or wood and is laid either under or across the bars 3 and 4 where the ground is rough or very soft. It will also be observed that the cut out corners 9 of the platform 8 permit of its snug engagement around the legs 7 of the arcuate wire supports 1 and 2. This element of the return gate may be either used or omitted according to the particular condition of the ground where the return gate is used.

What I claim is:

In combination with a fence to a poultry yarn having an opening therein, a poultry gate mounted at said opening and comprising a pair of distantly spaced arcuate supporting wires having pointed ends projecting into the ground and adapted to anchor the device, closely spaced parallel flexible wires affixed to the top and side portions of the arcuate supporting wires, the parallel wires extending beyond the arcuate supporting flexible wire farther from the fence and converging toward but spaced from each other to form a restricted opening of sufficient size to permit poultry to push therethrough but not to return, the said wires being resilient and individually expansible, and cross bars affixed to the respective arcute supporting wires close to the ground to brace same.

CLARK W. SIMONDS.